United States Patent
Hsiao et al.

(10) Patent No.: US 11,046,582 B2
(45) Date of Patent: Jun. 29, 2021

(54) METHOD OF PURIFYING SILICON CARBIDE POWDER

(71) Applicant: INDUSTRIAL TECHNOLOGY RESEARCH INSTITUTE, Hsinchu (TW)

(72) Inventors: Ta-Ching Hsiao, Zhudong Township (TW); Chu-Pi Jeng, Hsinchu (TW); Mu-Hsi Sung, Hsinchu (TW); Kuo-Lun Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 98 days.

(21) Appl. No.: 16/729,065

(22) Filed: Dec. 27, 2019

(65) Prior Publication Data
US 2021/0139330 A1    May 13, 2021

(30) Foreign Application Priority Data

Nov. 11, 2019   (TW) .................................. 10814079

(51) Int. Cl.
  *C01B 32/05*   (2017.01)
  *C01B 32/963*  (2017.01)
  *C01B 32/97*   (2017.01)

(52) U.S. Cl.
  CPC ............ *C01B 32/05* (2017.08); *C01B 32/963* (2017.08); *C01B 32/97* (2017.08); *C01P 2004/61* (2013.01); *C01P 2004/64* (2013.01)

(58) Field of Classification Search
  None
  See application file for complete search history.

(56) References Cited

U.S. PATENT DOCUMENTS

| | | | |
|---|---|---|---|
| 5,611,955 A | 3/1997 | Barrett et al. | |
| 6,214,108 B1* | 4/2001 | Okamoto | C30B 23/00 117/88 |
| 6,218,680 B1 | 4/2001 | Carter, Jr. et al. | |
| 6,881,680 B2 | 4/2005 | Fujita | |
| 7,029,643 B2 | 4/2006 | Otsuki et al. | |
| 7,553,373 B2* | 6/2009 | Otsuki | C30B 23/025 117/100 |
| 8,858,709 B1 | 10/2014 | Zwieback et al. | |
| 2003/0079676 A1 | 5/2003 | Ellison et al. | |
| 2003/0233975 A1 | 12/2003 | Jenny et al. | |
| 2004/0161376 A1 | 8/2004 | Otsuki et al. | |
| 2015/0218005 A1* | 8/2015 | Kim | C04B 35/565 428/402 |

FOREIGN PATENT DOCUMENTS

| | | |
|---|---|---|
| CN | 1592949 A | 3/2005 |
| CN | 1985029 A | 6/2007 |
| CN | 106968017 A | 7/2017 |
| CN | 107974712 A | 5/2018 |
| CN | 108118394 A | 6/2018 |
| RU | 882247 A1 * | 11/1996 |
| TW | 201202139 A | 1/2012 |
| TW | 201821656 A | 6/2018 |
| WO | WO 98/34281 | 8/1998 |
| WO | WO 02/097173 A2 | 12/2002 |
| WO | WO 2006/070480 A1 | 7/2006 |
| WO | WO 2012/088996 A1 | 7/2012 |

OTHER PUBLICATIONS

Yang et al.; Study of Nitrogen Concentration in Silicon Carbide; Electronic Materials, vol. 42 (Year: 2013).*
Bertran et al.; High Nucleation Rate in pure SiC Nanometric Powder by Combustion of Room Temperature Plasmas and Post-Thermal Treatments; Diamond and Related Materials; 8, 364-368; 1999.*
Glaser et al., "Estimation of Residual Nitrogen Concentration in Semi-Insulating 4H-SiC via low temperature photoluminescence", Applied Physics Letters 86, 2005, pp. 052109-1 to 052109-3.
Irmscher et al., "Formation and properties of stacking faults in nitrogen-doped 4H-SiC", Elsevier, Physica B 376-377, 2006, pp. 338-341.
Jenny et al., "Development of Large Diameter High-Purity Semi-Insulating 4H-SiC Wafers for Microwave Devices", Materials Science Forum, vol. 457-460, pp. 35-40, 2004.
Mitchel et al., "Electrical Properties of Unintentionally Doped Semi-Insulating and Conducting 6H-SiC", Journal of Applied Physics 100, 2006, pp. 043706-1 to 043706-5.
Ohtani et al., "Impurity Incorporation Kinetics During Modified-Lely Growth of SiC", Journal of Applied Physics 83, 1998, No. 8, pp. 4487-4490.
Phelps et al., "Enhanced Nitrogen Diffusion in 4H-SiC", Applied Physics Letters vol. 80, No. 2, pp. 228-230, 2002.
Rauls et al., "The Different Behavior of Nitrogen and Phosphorus as N-type dopant in SiC", Elsevier, Physica B: Condensed Matter, Dec. 2003, vol. 340-342, No. 31, pp. 184-189.
Wang et al., "Study of Nitrogen Concentration in Silicon Carbide", Journal of Electronic Materials, 2013, vol. 42, No. 6, pp. 1037-1041.
Taiwanese Notice of Allowance and Search Report for Taiwanese Application No. 108140793, dated May 18, 2020.

* cited by examiner

*Primary Examiner* — Guinever S Gregorio
(74) *Attorney, Agent, or Firm* — Birch, Stewart, Kolasch & Birch, LLP

(57) ABSTRACT

A method of purifying silicon carbide powder includes: providing a container with a surface coated by a nitrogen-removal metal layer, wherein the nitrogen-removal metal layer is tantalum, niobium, tungsten, or a combination thereof; putting a silicon carbide powder into the container to contact the nitrogen-removal metal layer; and heating the silicon carbide powder under an inert gas at a pressure of 400 torr to 760 torr at 1700° C. to 2300° C. for 2 to 10 hours, thereby reducing the nitrogen content of the silicon carbide powder.

14 Claims, No Drawings

METHOD OF PURIFYING SILICON CARBIDE POWDER

CROSS REFERENCE TO RELATED APPLICATIONS

The present application is based on, and claims priority from, Taiwan Application Serial Number 108140793, filed Nov. 11, 2019, the disclosure of which is hereby incorporated by reference herein in its entirety.

TECHNICAL FIELD

The technical field relates to a method of lowering the nitrogen content of silicon carbide powder.

BACKGROUND

Recently, silicon carbide has quickly developed as a semiconductor wafer material. Silicon carbide power electronics with excellent properties have gradually been introduced into solar cell inverters, electric vehicles and hybrid vehicles, white goods, smart grids, motors, and other applications, and the silicon carbide power electronics are considered as an important energy-saving technology for the future. Their excellent energy-saving performance is mainly based on physical properties such as breakdown electrical field (2.2 $MV*cm^{-1}$), high thermal conductivity (4.9 $W*cm^{-1}*K$), high saturation drift velocity ($2*10^7$ $cm*s^{-1}$), and the like. The silicon carbide wafer for the power electronics is conductive type. Nitrogen doped n-type wafer has low on-state resistance, which dramatically reduces the on-state and switch loss to enhance energy efficiency.

In addition, with the coming of IoT and 5G age, high-speed wireless communication is a critical development technology, and operation frequency will be greatly increased from the current hundreds of MHz to more than tens of GHz to meet the data rate of several Gbps and the requirement of rapid growth of network devices. In high frequency electronics, silicon based laterally diffused metal oxide semiconductors (LDMOS), GaAs heterojunction bipolar transistors (HBT), and GaN high electron mobility transistors (HEMT) show potential for use in microwave communication devices. The semi-insulation silicon carbide wafer is the major choice of substrate to grow GaN epitaxy layers, and the semi-insulation wafer is another important application of silicon carbide (compared to conventional conductive-type wafers).

The semi-insulation wafer has a resistance that is higher than $10^5$ Ω-cm and even up to $10^{12}$ Ω-cm, which is significantly higher than that of a conductive-type silicon carbide wafer (e.g. 0.01 Ω-cm to 0.03 Ω-cm). The semi-insulation silicon carbide is an excellent substrate material for nitride semiconductor elements, because the lattice coefficient difference between the silicon carbide substrate and the nitride semiconductor elements is little. Moreover, the crystal growth technology of the nitride semiconductor is not matured, which limits the development of native epitaxy growth of nitride and device manufacture. However, the concentration of the conductive-type impurity (especially the nitrogen that is rich in environment and air) should be well controlled to achieve high resistance for the semi-insulation silicon carbide substrate. The silicon carbide powder is the major raw material for growing silicon carbide crystal, and the nitrogen content of the silicon carbide wafer is highly influenced by the nitrogen content of silicon carbide powder. As such, the silicon carbide powder with low nitrogen content is a critical raw material in producing semi-insulation wafers.

Because silicon carbide is one kind of group IV semiconductors, group III and V impurities have high solid solubility in a silicon carbide lattice. The solubility of nitrogen is higher than $10^{20}/cm^3$. As such, it is difficult to separate nitrogen from silicon carbide lattice. In addition, the silicon carbide has strong covalent bonds, and most of the impurities have slow diffusion rate in the silicon carbide lattice. For example, nitrogen in a silicon carbide lattice has a diffusion coefficient of only $3*10^{-11}$ $cm^2$ $S^{-1}$ at 1800° C., thereby also increasing the difficulty of separating nitrogen from silicon carbide. In addition to the difficulty of removal, the nitrogen content of air is close to 80%. If the process is not well properly controlled, it could cause the nitrogen pollution. Therefore, silicon carbide with low nitrogen content is critical in the silicon carbide industry, which is also a major reason for the silicon carbide wafer not being widely used at present.

Accordingly, a novel method of lowering the nitrogen content of silicon carbide powder is called for.

SUMMARY

One embodiment of the disclosure provides a method of purifying silicon carbide powder, including: providing a container with a surface coated by a nitrogen-removal metal layer, wherein the nitrogen-removal metal layer is tantalum, niobium, tungsten, or a combination thereof putting a silicon carbide powder into the container; and heating the silicon carbide powder under an inert gas at a pressure of 400 torr to 760 torr at 1700° C. to 2300° C. for 2 hours to 10 hours, thereby lowering the nitrogen content of the silicon carbide powder.

In some embodiments, the silicon carbide powder is formed by: mixing a carbon source powder and a silicon source powder to form a mixture; and heating the mixture under a pressure of 1 torr to 100 torr at 1500° C. to 2000° C. for 2 to 5 hours, thereby forming the silicon carbide powder, wherein the temperature of heating the mixture is lower than the temperature of heating the silicon carbide powder.

In some embodiments, the silicon source powder includes silicon, silicon oxide, or a combination thereof.

In some embodiments, the carbon source powder includes carbon black, graphite, graphene, carbon nanotube, or a combination thereof.

In some embodiments, the material of the container includes graphite, ceramic, or a high-melting point metal.

In some embodiments, the inert gas includes hydrogen, argon, or a combination thereof.

In some embodiments, a pipeline for providing the inert gas includes a nitrogen filtration device.

In some embodiments, the silicon carbide powder has a diameter of 10 nm to 5 micrometers.

In some embodiments, the silicon carbide powder has a diameter of 10 nm to 100 nm, and the temperature of heating the silicon carbide powder is 1700° C. to 1900° C.

In some embodiments, the silicon carbide powder has a diameter of 100 nm to 1 micrometer, and the temperature of heating the silicon carbide powder is 1900° C. to 2100° C.

In some embodiments, the silicon carbide powder has a diameter of 1 micrometer to 5 micrometers, and the temperature of heating the silicon carbide powder is 2100° C. to 2300° C.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of purifying silicon carbide powder, including: providing a container with a surface coated by a nitrogen-removal metal layer. In some embodiments, the container can be composed of graphite, ceramic, or a high-melting point metal. For example, the container can be graphite crucible. In one embodiment, the high melting temperature metal can be tungsten, niobium, tungsten, or a combination thereof. For example, single layer or multi-layers of tantalum, niobium, tungsten, or an alloy thereof can be coated on the surface of the container. The nitrogen-removal metal layer can be formed by sputtering, electroplating, electroless plating, or another suitable process.

Subsequently, a silicon carbide powder is put into the container as the source material. The silicon carbide powder can be commercially available silicon carbide powder, or self-synthesized silicon carbide powder. For example, a carbon source powder and a silicon source powder can be mixed to form a mixture. In one embodiment, the silicon source powder comprises silicon, silicon oxide, or a combination thereof. In one embodiment, the carbon source powder comprises carbon black, graphite, graphene, carbon nanotube, or a combination thereof. Subsequently, the mixture is heated under a pressure of 1 torr to 100 torr at 1500° C. to 2000° C. for 2 to 5 hours to form the silicon carbide powder. If the pressure of heating the mixture is too low, it may lose a lot of source materials. If the pressure of heating the mixture is too high, it is unfavorable to perform the reaction. If the temperature of heating the mixture is too low or the period of heating the mixture is too short, the reaction may be incomplete. If the temperature of heating the mixture is too high or the period of heating the mixture is too long, it may consume more energy and change the quality of the silicon carbide powder. The temperature of heating the mixture is lower than the temperature of heating the silicon carbide powder. If the temperature of heating the mixture is higher than or equal to the temperature of heating the silicon carbide powder, it may consume more energy and change the quality of the silicon carbide powder.

Subsequently, the silicon carbide powder is heated under an inert gas at a pressure of 400 torr to 760 torr at 1700° C. to 2300° C. for 2 hours to 10 hours, thereby lowering the nitrogen content of the silicon carbide powder. If the pressure of the inert gas is too low, the material may be greatly consumed due to volatized. If the pressure of the inert gas is too high, the reaction should be performed in a high pressure vessel, which increase the complexity of the equipment. If the temperature of heating the silicon carbide powder is too low or the period of heating the silicon carbide powder is too short, the nitrogen-removal effect will be not excellent. If the temperature of heating the silicon carbide powder is too high or the period of heating the silicon carbide powder is too long, it may consume more energy and change the quality of the silicon carbide powder.

In some embodiments, the inert gas comprises hydrogen, argon, or a combination thereof. In some embodiments, a pipeline for providing the inert gas includes a nitrogen filtration device, thereby preventing the nitrogen in the inert gas from lowering the nitrogen-removal effect.

In some embodiments, the silicon carbide powder has a diameter of 10 nm to 5 micrometers. For example, when the silicon carbide powder has a diameter of 10 nm to 100 nm, the temperature of heating the silicon carbide powder is 1700° C. to 1900° C. When the silicon carbide powder has a diameter of 100 nm to 1 micrometer, the temperature of heating the silicon carbide powder is 1900° C. to 2100° C. When the silicon carbide powder has a diameter of 1 micrometer to 5 micrometers, and the temperature of heating the silicon carbide powder is 2100° C. to 2300° C. It should be understood that the diffusion distance for nitrogen in the silicon carbide powder is longer when the silicon carbide powder is larger, and it needs a higher temperature to drive nitrogen (inside the silicon carbide powder) migrating outward. The nitrogen content of the silicon carbide powder can be reduced to be lower than 30 ppm (such as 1 ppm to 20 ppm) after the above process.

Alternatively, the thickness of the nitrogen-removal metal layer coated on the container surface depends on the composition of the nitrogen-removal metal layer and the silicon carbide amount to be treated. If more silicon carbide material treated in the process, the nitrogen-removal metal layer is necessary to be thicker to avoid the nitrogen-removal metal layer be saturated before adsorbing the majority of nitrogen in the silicon carbide. If less silicon carbide material treated in the process, the unsaturated nitrogen-removal metal layer can be used to next batch of nitrogen-removal process. If the nitrogen-removal metal layer is too thin, it will be saturated before removing majority of the nitrogen in the silicon carbide. If the nitrogen-removal metal layer is too thick, it may not adsorb the nitrogen in the silicon carbide any more before being completely saturated.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

600 g of silicon oxide serving as silicon source powder and 240 g of graphite serving as carbon source powder were homogeneously mixed and then put into a graphite crucible. The mixture was reacted at a temperature of 1800° C. under a pressure of 1 torr for 3 hours to form a silicon carbide powder. The silicon carbide powder, having overly high nitrogen content, was called original silicon carbide powder. A tantalum layer is coated on an inner sidewall surface of another graphite crucible to serve as an adsorption material for nitrogen. The original silicon carbide powder was put into the graphite crucible coated by the tantalum layer, and then put into a high temperature reaction furnace. The chamber of the furnace was vacuumed to 0.01 torr by a vacuum pump, and then purged by argon of high purity three times. Subsequently, the original silicon carbide powder was heated to 2000° C. and kept under 660 torr for 5 hours, and then cooled to room temperature. The original silicon carbide powder and the silicon carbide powder after removal of nitrogen were respectively analyzed by a nitrogen analyzer to measure their nitrogen content. The original silicon carbide powder had a nitrogen content of 62.4 ppm, and the silicon carbide powder after removal of nitrogen had a greatly reduced nitrogen content of 8.2 ppm, as shown in Table 1.

Example 2

600 g of silicon oxide serving as silicon source powder and 240 g of graphite serving as carbon source powder were homogeneously mixed and then put into a graphite crucible. The mixture was reacted at a temperature of 1800° C. under a pressure of 1 torr for 3 hours to form a silicon carbide powder. The silicon carbide powder, having overly high nitrogen content, was called original silicon carbide powder. A tantalum layer is coated on an inner sidewall surface of another graphite crucible to serve as an adsorption material for nitrogen. The original silicon carbide powder was put into the graphite crucible coated by the tantalum layer, and then put into a high temperature reaction furnace. The chamber of the furnace was vacuumed to 0.01 torr by a vacuum pump, and then purged by argon of high purity three times. A pipeline for introducing the argon of high purity was further set up a nitrogen filtration device. Subsequently, the original silicon carbide powder was heated to 2000° C. and kept under 660 torr for 5 hours, and then cooled to room temperature. The original silicon carbide powder and the silicon carbide powder after removal of nitrogen were respectively analyzed by a nitrogen analyzer to measure their nitrogen content. The original silicon carbide powder had a nitrogen content of 62.4 ppm, and the silicon carbide powder after removal of nitrogen had a greatly reduced nitrogen content of 2.0 ppm, as shown in Table 1.

Example 3

600 g of silicon oxide serving as silicon source powder and 240 g of graphite serving as carbon source powder were homogeneously mixed and then put into a graphite crucible. The mixture was reacted at a temperature of 1800° C. under a pressure of 1 torr for 3 hours to form a silicon carbide powder. The silicon carbide powder, having overly high nitrogen content, was called original silicon carbide powder. A tantalum layer is coated on an inner sidewall surface of another graphite crucible to serve as an adsorption material for nitrogen. The original silicon carbide powder was put into the graphite crucible coated by the tantalum layer, and then put into a high temperature reaction furnace. The chamber of the furnace was vacuumed to 0.01 torr by a vacuum pump, and then purged by argon of high purity three times. Subsequently, the original silicon carbide powder was heated to 1900° C. and kept under 660 torr for 3 hours, and then cooled to room temperature. The original silicon carbide powder and the silicon carbide powder after removal of nitrogen were respectively analyzed by a nitrogen analyzer to measure their nitrogen content. The original silicon carbide powder had a nitrogen content of 62.4 ppm, and the silicon carbide powder after removal of nitrogen had a greatly reduced nitrogen content of 17.2 ppm, as shown in Table 1.

Example 4

600 g of silicon oxide serving as silicon source powder and 240 g of graphite serving as carbon source powder were homogeneously mixed and then put into a graphite crucible. The mixture was reacted at a temperature of 1800° C. under a pressure of 1 torr for 3 hours to form a silicon carbide powder. The silicon carbide powder, having overly high nitrogen content, was called original silicon carbide powder. A tantalum layer is coated on an inner sidewall surface of another graphite crucible to serve as an adsorption material for nitrogen. The original silicon carbide powder was put into the graphite crucible coated by the tantalum layer, and then put into a high temperature reaction furnace. The chamber of the furnace was vacuumed to 0.01 torr by a vacuum pump, and then purged by argon of high purity three times. Subsequently, the original silicon carbide powder was heated to 2000° C. and kept under 660 torr for 3 hours, and then cooled to room temperature. The original silicon carbide powder and the silicon carbide powder after removal of nitrogen were respectively analyzed by a nitrogen analyzer to measure their nitrogen content. The original silicon carbide powder had a nitrogen content of 62.4 ppm, and the silicon carbide powder after removal of nitrogen had a greatly reduced nitrogen content of 29.1 ppm, as shown in Table 1. The apparatus for the above process had a poor vacuum degree, thereby degrading the nitrogen-removal effect.

Example 5

600 g of silicon oxide serving as silicon source powder and 240 g of graphite serving as carbon source powder were homogeneously mixed and then put into a graphite crucible. The mixture was reacted at a temperature of 1800° C. under a pressure of 1 torr for 3 hours to form a silicon carbide powder. The silicon carbide powder, having overly high nitrogen content, was called original silicon carbide powder. A tantalum layer is coated on an inner sidewall surface of another graphite crucible to serve as an adsorption material for nitrogen. The original silicon carbide powder was put into the graphite crucible coated by the tantalum layer, and then put into a high temperature reaction furnace. The chamber of the furnace was vacuumed to 0.01 torr by a vacuum pump, and then purged by argon of high purity three times. Subsequently, the original silicon carbide powder was heated to 1900° C. and kept under 660 torr for 3 hours, and then cooled to room temperature. The original silicon carbide powder and the silicon carbide powder after removal of nitrogen were respectively analyzed by a nitrogen analyzer to measure their nitrogen content. The original silicon carbide powder had a nitrogen content of 62.4 ppm, and the silicon carbide powder after removal of nitrogen had a greatly reduced nitrogen content of 10.6 ppm, as shown in Table 1.

TABLE 1

| | Nitrogen-removal metal layer | Nitrogen content of original silicon carbide powder | Nitrogen content of the powder after removal of nitrogen |
| --- | --- | --- | --- |
| Example 1 | Ta | 62.4 ppm | 8.2 ppm |
| Example 2 | Ta | 62.4 ppm | 2.0 ppm |
| Example 3 | Ta | 62.4 ppm | 17.2 ppm |
| Example 4 | Ta | 62.4 ppm | 29.1 ppm |
| Example 5 | Ta | 62.4 ppm | 10.6 ppm |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method of purifying silicon carbide powder, comprising:
   providing a container with a surface coated by a nitrogen-removal metal layer, wherein the nitrogen-removal metal layer is tantalum, niobium, tungsten, or a combination thereof;
   putting an initial silicon carbide powder into the container to contact the nitrogen-removal metal layer; and
   heating the initial silicon carbide powder under an inert gas at a pressure of 400 torr to 760 torr at 1700° C. to 2300° C. for 2 hours to 10 hours to provide a final silicon carbide powder, wherein the final silicon carbide powder has a nitrogen content of less than or equal to 29.1 ppm.

2. The method as claimed in claim 1, wherein the initial silicon carbide powder is formed by:
   mixing a carbon source powder and a silicon source powder to form a mixture; and
   heating the mixture under a pressure of 1 torr to 100 torr at 1500° C. to 2000° C. for 2 to 5 hours, thereby forming the initial silicon carbide powder,
   wherein the temperature of heating the mixture is lower than the temperature of heating the initial silicon carbide powder.

3. The method as claimed in claim 2, wherein the silicon source powder comprises silicon, silicon oxide, or a combination thereof.

4. The method as claimed in claim 2, wherein the carbon source powder comprises carbon black, graphite, graphene, carbon nanotube, or a combination thereof.

5. The method as claimed in claim 1, wherein a material of the container comprises graphite, ceramic, or a high-melting point metal.

6. The method as claimed in claim 1, wherein the inert gas comprises hydrogen, argon, or a combination thereof.

7. The method as claimed in claim 1, wherein a pipeline for providing the inert gas includes a nitrogen filtration device.

8. The method as claimed in claim 1, wherein the initial silicon carbide powder has a diameter of 10 nm to 5 micrometers.

9. The method as claimed in claim 1, wherein the initial silicon carbide powder has a diameter of 10 nm to 100 nm, and the temperature of heating the initial silicon carbide powder is 1700° C. to 1900° C.

10. The method as claimed in claim 1, wherein the initial silicon carbide powder has a diameter of 100 nm to 1 micrometer, and the temperature of heating the initial silicon carbide powder is 1900° C. to 2100° C.

11. The method as claimed in claim 1, wherein the initial silicon carbide powder has a diameter of 1 micrometer to 5 micrometers, and the temperature of heating the initial silicon carbide powder is 2100° C. to 2300° C.

12. The method of claim 1, wherein the final silicon carbide powder has a nitrogen content of less than or equal to 17.2 ppm.

13. The method of claim 1, wherein the final silicon carbide powder has a nitrogen content of less than or equal to 10.6 ppm.

14. The method of claim 1, wherein the final silicon carbide powder has a nitrogen content of less than or equal to 2 ppm.

* * * * *